Sept. 12, 1967   F. H. U. ROSENCRANTZ   3,341,640
PROCESS FOR THE MANUFACTURE OF PAD BODY
Filed May 7, 1964
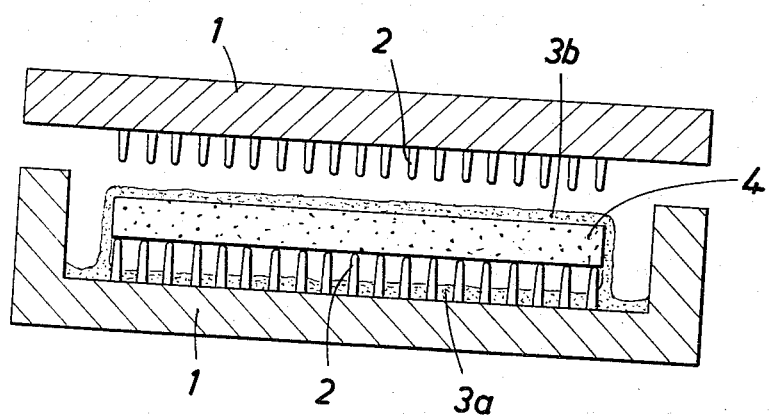
Inventor
Fredrik H.U. Rosencrantz
by Sommers & Young
Attorneys

United States Patent Office 3,341,640
Patented Sept. 12, 1967

3,341,640
PROCESS FOR THE MANUFACTURE OF PAD BODY
Fredrik Holger Ulfstand Rosencrantz,
O. Jarnvagsgatan 16, Tranas, Sweden
Filed May 7, 1964, Ser. No. 365,685
Claims priority, application Sweden, May 14, 1963, 5,307/63
4 Claims. (Cl. 264—46)

This invention is concerned with improvements in the manufacture of pad bodies serving, e.g., as supports on which to rest—sit, lie on or lean against. During the last years such pad bodies, e.g., mattresses, cushions and pads of various types have to an increasing extent been made of foamed rubber or foamed plastics to replace the conventional pad bodies of the stuffed mattress or stuffed cushion type. Foamed rubber paddings are more durable than those made of foamed plastics but they are heavier, and moreover foamed rubber is a more expensive material than foamed plastics. Both these types of pads or paddings are as a rule substantially flat bodies, by reason of the technique employed in their manufacture, for in order to produce, e.g., convex products it is necessary either to use molds having interior wall surfaces of such special curvature as is required in each individual case, or to cut the product to the desired shape which involves loss of material (trimmings). However, a convex curvature is often desired at least on one face of the pad body, especially if this is a mattress which indeed should have a slightly convex upper face to provide optimum support for a person in the prostrate position.

An object of the present invention is to provide a process for the manufacture of a pad body generally on a rubber foam basis which has the above-mentioned desirable configuration and which can be manufactured conveniently and economically. Further objects and advantages will become apparent in the course of the detailed description below.

The term "padding," "pad" or "pad body" as here employed is to be construed in a broad manner, to comprise every kind of short and long pads serving as a support on which a person may sit or lie down, or lean against, as in the back of a chair, such as mattresses, cushions and other pads of all kinds.

The pad body manufactured according to this invention comprises a core of foamed plastics or foamed rubber surrounded on all sides by a body of foamed rubber which is vulcanized onto the core, the padding or pad body having at least on one of its two large faces a convex curvature so that it is thicker in its central portions than in its marginal portions. The core may be convex in itself and/or the foamed rubber vulcanized onto the core may, at least on one and preferably on both sides of the pad body, constitute a layer of a thickness increasing from the marginal or edge portions towards the central portion.

The core preferably consists of a cured foamed thermosetting plastics, i.e., a synthetic resin or plastics material of the type that is capable of being cured under the action of heat. Polyurethane plastics, in particular polyurethane polyethers, are specially preferred.

Furthermore, it is preferred, especially when the product is a mattress or is a cushion or pad to be used as a seat, that both of its two large forces be of a convex configuration, so that either the one or the other face may be turned up. In the following description reference will be made to a mattress, but it is to be understood that the invention is applicable also to other pad bodies or paddings of any kind.

The mattress of this invention provides a very good support due to its convex curvature, and its supporting properties may be enhanced still further by making the core harder than the surrounding rubber foam. There will thus be obtained a combination of pleasant surface softness and firm support, the latter consisting in a resilient or "springy" resistance to a person's sinking down, this resistance being provided by the core which is attached to the foamed rubber by the aforesaid vulcanization bond.

According to a preferred embodiment, the foamed rubber layers on the two faces of the mattress are provided with a great number of airholes formed in a manner which is known per se with foamed rubber products. The airholes extend from the surfaces into the interior down to or substantially down to the core but not into the core. The combined surface softness and stable support are accentuated still more in this embodiment. The airholes should preferably be positioned at close intervals and be distributed uniformly over both faces of the mattress. A narrow marginal portion, however, should preferably be free of airholes in order to ensure optimum strength. The hole diameter may be as little as 3 mm. but is often and preferably much greater, e.g., 5–30 mm.

The mattress according to the invention, especially in the above-mentioned airhole embodiment, has in comparison with known rubber foam mattresses the further advantage that it may contain a considerably smaller amount of rubber material, without thereby losing any of its supporting capacity. The amount of rubber saved will of course be particularly great when the core consists of foamed plastics—and this is actually preferred—as the core may have more than twice the thickness of each rubber layer above and below the core. A further amount of rubber is saved due to the basic construction principle itself, i.e., with a core attached to the surrounding rubber by vulcanization of the latter, and due to the convex configuration of the mattress; the supporting capacity is actually enhanced in this manner to such an important degree that the material surrounding the core may be made of a rubber foam of less volume weight than that commonly employed in conventional rubber foam mattresses—and this without in any way deteriorating the supporting qualities. Thus, there will be obtained a mattress which is relatively light in weight, and the costs of material will be low. As compared to foamed plastics mattresses of known types, the mattress according to the present invention is far superior with respect to its supporting properties (inherent stability), as well as with respect to durability on being used for a prolonged period of time. Its durable character or long life is due in part also to the fact that the outer layers are vulcanized onto the core, so the mattress as a whole forms a very strongly cohering unit, contrary to what would be the case if the layers were adhered to each other only by ordinary binders or adhesives As far as the manufacture of the novel mattress is concerned, the invention provides the further advantage that the layers of foamed rubbed surrounding the core can be both produced and bonded to the core in one single step, and that in the manufacturing process as contemplated the convex shape is obtainable and variable while using molds of planar inner wall surfaces and avoiding the necessity of cutting or trimming with concomitant offal. The mattress (or other pad body) is preferably made in a casting mold of the general type described in the U.S. specification 3,028,610, and the present invention comprises also a process for manufacturing the novel pad bodies. The mold has a bottom portion and a removable lid portion, with a great number of metal pins extending into the mold cavity from the mold bottom upwardly and from the lid downwardly. In the practice of the process according to this invention, the upper and lower pins should preferably be arranged with their ends or tips directly opposite each other, but they must be short enough to leave a free space between said upper and lower pin ends when the mold is closed. These pins which as a rule are cylindrical in shape may be of greater thickness and disposed at much shorter intervals inter se than is shown in the aforesaid U.S. specification.

For the manufacture of, e.g., a mattress in accordance with the present invention, a latex composition containing foaming and vulcanizing agents or only vulcanizing agents, in which case it is whipped, is introduced into a horizontally elongated mold of the above-described type and is in a manner known per se converted to foam structure, coagulated and vulcanized in said mold, the primary characteristic feature of the process according to the invention consisting in that besides the latex composition a pre-fabricated panel of foamed plastics (or, if desired, foamed rubber) is placed in the open mold, said panel having smaller dimensions than the mold cavity but having a thickness exceeding the distance existing between the upper and lower pin ends when the mold is closed, so that this panel, which is placed on the ends of the bottom pins and substantially centrally in the mold, will after closing of the mold be compressed between the upper and lower pin ends while at the same time the liquid latex composition swells up under the action of the foaming agent to form a foam, and is then coagulated and vulcanized, this latter step implying that the rubber foam is vulcanized onto the panel on all its sides; the mattress product thus obtained is removed from the mold, and the panel, i.e., the core of the mattress, which has thus been released from the pressure exerted by the pins is now allowed or caused to expand, if desired with supply of heat. This in turn causes the two mattress faces—which are substantially over their entire area provided with airholes made by the pins—to acquire a convex curvature.

An embodiment of the invention will be described below with reference to the attached drawing. It will be understood, however, that the present invention is not in any way restricted to this embodiment.

The drawing shows schematically a longitudinal section of a mold containing the materials for making a mattress, the lid of the mold being shown in a raised position. The mold designated by reference number 1 is provided with upper and lower metal pins 2 extending vertically downwardly from the lid and vertically upwardly from the bottom of the mold. They are distributed uniformly over the entire lid and bottom portions except for a narrow marginal zone on all four sides where it is desired that the product should not have any airholes. All the interior wall (including lid and bottom) surfaces of the mold 1 are plane. Pins 2 may be either solid or hollow elements. If they are hollow they should have closed ends which should preferably be rounded off in such a manner that each pin will have a shape similar to that of a test tube. Such a rounded-off configuration is advantageous also if the pins 2 are solid (compact) elements. Instead of the substantially cylindrical pins may be employed pins or pegs tapering towards their free ends. The mold 1 is connected to conduits (not shown) for supplying and withdrawing coolant and heating media. For the manufacture of a mattress or the like, a liquid rubber latex composition of conventional kind has been prepared outside the mold on the basis of, e.g., butadiene, styrenebutadiene, isoprene and/or chloroprene, or a natural rubber latex composition, with incorporation of a foaming agent, a vulcanizing agent and if desired further additives such as are usually employed in the manufacture of foam rubbers, the amount of said foaming agent having been chosen so as to give the product the desired volume weight. This volume weight may vary within wide limits but is preferably within the range of between 60 and 100 kilograms per cubic meter. The foaming agent, such as for instance a substance giving off oxygen, is preferably added at the last moment immediately before the composition is introduced into the mold 1. A portion 3a of the latex composition is poured onto the bottom of the mold; next a flexible panel 4 of foamed rubber, or preferably, foamed plastics is placed on the pins extending upwardly from the mold bottom; and then another portion 3b of the latex composition is poured over panel 4. This panel may consist, e.g., of a foamed polyurethane plastics having a volume of weight of between 12 and 40 kilograms per cubic meter. Immediately after introduction of latex composition 3a, panel 4, and latex composition 3b, the lid is lowered so as to close the mold and to thus subject the panel 4 to vigorous compression between the upper and lower pins 2. The latex composition is allowed to form a foam at room or ambient temperature, whereupon a coolant such as ethylene glycol is introduced whereby the rubber foam is cooled efficiently through the closely interspaced metal pins 2. Next follows coagulation of the foam by introduction of $CO_2$, and then introduction of a heating medium (which may also be ethylene glycol) to vulcanize the rubber foam at an elevated temperature, as a rule between about 90 and about 120° C., preferably about 105–120° C. This will automatically result in a solid bond between core 4 and the foamed rubber structure, without any intermediary juncture layer, as the rubber is vulcanized onto the core on all the sides thereof. As soon as the mattress is removed from the mold after the vulcanization stage, its core 4 will begin to expand. Such expansion can be promoted still further by supplying heat and moisture (e.g., water and/or steam), for instance during a subsequent washing treatment.

Mattresses of particularly pronounced convexity may be produced if during the manufacture in the mold the panel (core) is subjected to stronger compression in its central portions than in its side portions; this may be achieved either by making panel 4 initially thicker in its central portions than in its side portions or by making the distance between the pin ends shortest in the center so that it will progressively increase towards all four sides. In this last-mentioned embodiment there will of course also be obtained a thicker rubber layer in the central portion than in the side portions—despite the fact that the interior faces of the mold lid and mold bottom, as well as the faces of the panel (in its original uncompressed state) are all plane. However, experience has actually shown that the convex shape of the final product is obtained also if the initial foamed plastics panel is quite flat and the distance between the pin ends is the same over the whole area.

In the final expanded mattress (seat pad, cushion etc.) the core in the central portion of the product may for instance have a thickness of 7–8 cm. and each foamed rubber layer under and on top of the core may have a thickness of about 3 cm.

As regards the diameter of the pins, this will naturally be chosen such as to give the desired hole diameter in the final product. The pin diameter at the free ends of the pins should not be less than about 3 mm., as otherwise there might be a risk of the pins penetrating into the core. This would be undesirable because the core should remain free of airholes for the sake of stability. The pin and pin end diameter will often considerably exceed 3 mm. and may be, e.g., 5–30 mm. As will be seen from the above description, the metal pins may in accordance with the present invention be utilized to perform four different functions, namely (i) to form holes in the rubber foam structure, (ii) to serve as auxiliary elements for the cooling and the conveying of heat, (iii) to carry the core panel, and (iv) to cause compression of said panel.

It will be understood that the present invention is not in any way limited to the particular embodiments described above, but that many modifications may be made therein without transgression of the scope and spirit of this invention.

I claim:

1. In a process for producing a pad body by foaming and vulcanizing a latex composition which contains foaming and vulcanizing agents in a mold comprising a bottom, side walls, and a lid defining together a mold cavity of a height lesser than its length and width, said lid being movable for opening and closing said mold, said lid and bottom each being provided with a plurality of metal pins disposed in close relationship to each other and extending into said mold cavity to such a limited depth as to leave a space between the ends of the lid pins and the ends of the bottom pins when said mold is closed, the improvement that, in order to bestow a convex curvature on the pad body to be produced, placing an elastic panel, which is made of foamed plastics and has a lesser length and width than said mold cavity but a thickness greater than said space between said pin ends, on the end of said bottom pins and substantially centrally in said mold while the latter is open, introducing said latex composition underneath and on top of said panel resting on said bottom pins, then closing said mold to compress said panel between the ends of said lid pins and the ends of said bottom pins while said latex composition is converted to a foam provided with holes corresponding to the dimensions of said lid and bottom pins and is then vulcanized, whereby the foamed rubber structure thus produced is vulcanized firmly onto said panel on all sides thereof, then opening said mold and the vulcanized structure containing said compressed panel is removed from said mold, said panel thus being released from the compressive stress of said pins, and said panel being allowed to freely expand in this released state until a pad body is obtained which has a convex curvature on both of its faces.

2. A process as claimed in claim 1 in which the vulcanized product removed from said mold is subjected to the action of steam to promote expansion of said compressed panel.

3. A process as claimed in claim 1 in which the vulcanized product removed from said mold is washed with hot water to promote expansion of said compressed panel.

4. A process as claimed in claim 1 in which said panel consists of a foamed polyurethane polyether.

References Cited

UNITED STATES PATENTS

| 2,234,506 | 3/1941 | Sistig | 5—361 |
| 3,026,574 | 3/1962 | Takacs et al. | 264—46 |
| 3,108,852 | 10/1963 | Olsen | 264—46 |

FOREIGN PATENTS

| 748,990 | 5/1956 | Great Britain. |
| 978,164 | 12/1964 | Great Britain. |
| 1,293,628 | 4/1962 | France. |

ALEXANDER H. BRODMERKEL, *Primary Examiner.*

DOUGLAS J. DRUMMOND, *Examiner.*

P. E. ANDERSON, *Assistant Examiner.*